United States Patent [19]

Dixit et al.

[11] Patent Number: 4,818,824
[45] Date of Patent: Apr. 4, 1989

[54] CLOSURE FOR AERIAL TELEPHONE CABLE SPLICES

[75] Inventors: Mayankkumar M. Dixit, Basking Ridge; Charles Tanzola, Chester, both of N.J.

[73] Assignee: American Telephone and Telegraph Company, AT&T Bell Laboratories, Murray Hill, N.J.

[21] Appl. No.: 87,122

[22] Filed: Aug. 19, 1987

[51] Int. Cl.$^4$ ............... H02G 15/113; H02G 7/06; H02G 15/18; F16B 19/00

[52] U.S. Cl. ................... 174/92; 24/453; 24/618; 24/704.1; 174/41; 292/327; 403/408.1; 411/500; 411/907; 411/910

[58] Field of Search ............... 174/41, 76, 92, 138 D; 24/1, 102 A, 102 P, 107, 297, 453, 618, 662, 704; 138/158, 159, 160; 292/327; 403/408.1; 411/2, 500, 508, 509, 510, 548, 904, 907, 908, 910

[56] References Cited

U.S. PATENT DOCUMENTS

| | | | |
|---|---|---|---|
| 1,857,903 | 5/1932 | Wensley et al. | 174/138 D X |
| 3,235,297 | 2/1966 | Fernberg | 24/453 X |
| 3,255,302 | 6/1966 | Frank, Jr. | 174/76 X |
| 3,494,244 | 2/1970 | Wayland | 411/510 |
| 3,768,849 | 10/1973 | Sytko | 292/327 |
| 3,836,696 | 9/1974 | Gressitt et al. | 174/41 |
| 3,875,325 | 4/1975 | Anderson et al. | 174/92 |
| 3,896,260 | 7/1975 | Plummer | 174/76 X |
| 4,403,377 | 9/1983 | Mizusawa | 24/297 X |

FOREIGN PATENT DOCUMENTS

| | | | |
|---|---|---|---|
| 240118 | 8/1962 | Australia | 24/297 |
| 1947057 | 3/1970 | Fed. Rep. of Germany | 174/92 |
| 3035183 | 4/1982 | Fed. Rep. of Germany | 174/92 |
| 621404 | 4/1949 | United Kingdom | 24/618 |
| 1413650 | 11/1975 | United Kingdom | 174/92 |

*Primary Examiner*—Laramie E. Askin
*Attorney, Agent, or Firm*—Jack S. Cubert

[57] ABSTRACT

Splices between conductors in of an aerial telephone cable are covered by a closure located within a terminal. The closure has a large central section connected via tapered joints to two end sections. A settable liquid encapsulant is received in the central section. The closure has two halves joined by a flexible hinge that runs lengthwise along a first longitudinal edge. Two rigid tabs of nonuniform thickness running lengthwise along a second longitudinal edge are secured by snaps through apertures in the tabs. The snaps have tapered sections that clamp the varying thickness rigid tabs along their lengths to prevent leakage of liquid encapsulant. The end sections have open cell foam strips fitting snugly between the cable and the end section walls which are fixed with the liquid encapsulant. The encapsulant sets within the open cell foam to form a barrier to passage of contaminants into the central section.

8 Claims, 6 Drawing Sheets

CLOSURE FOR AERIAL TELEPHONE CABLE SPLICES

TECHNICAL FIELD

This invention relates to closures for splices between electrical conductors in a stub cable and a telephone aerial cable and, in particular, to closures for use in an aerial cable terminal.

BACKGROUND OF THE INVENTION

Splices between conductors of an aerial cable and a stub cable need to be protected against damage caused by insects, oxygen, moisture and the like. An example of a terminal incorporating such splices is disclosed in U.S. Pat. No. 3,836,696. This terminal has a rear compartment where splices are located and a front compartment where service or drop wires are connected to binding posts. The rear ends of the binding posts are connected to the aerial cable conductors via a stub cable. The aforementioned protection can be obtained by encasing the conductor splices in an encapsulant. Encasing also limits access to the splices by unauthorized persons and during work operations not associated with the splicing itself.

U.S. Pat. No. 3,875,325 issued to C. V. Anderson et al Apr. 1, 1975 discloses a telephone splice closure in which a semisolid gel type encapsulant is poured under pressure into an assembled splice closure which includes air vents to assure filling the interior of the closure. While such an arrangement provides the needed protection for the splices, it is more convenient in aerial plant installations to use an encapsulant that is poured around the splices in liquid form which later solidifies to provide the needed protection from damage.

Leakage of liquid encapsulant should be prevented to assure containment of the encapsulant in the splice region until solidification. Consequently, the closure must be substantially sealed against leakage of encapsulant prior to entrance of the encapsulant therein, but provision must be made to assure complete filling of the splice closure. It is also desirable to use an inexpensive closure and to keep the sealing operations simple and convenient since the encapsulation operations are performed off ground. The cost of the closure may be reduced if it is fabricated by vacuum forming or another economical process. These processes, however, often result in closure walls that vary substantially in thickness. The nonuniform thickness makes adequate containment of the liquid encapsulant difficult. It is an object of the invention to provide an improved splice closure having varying wall thickness adapted to be filled with a liquid encapsulant without leakage thereof.

SUMMARY OF THE INVENTION

The invention is directed to a splice enclosure for an aerial cable shaped to form a longitudinal cavity having first and second halves each with first and second longitudinal edges. The first longitudinal edges of the first and second halves are joined along their lengths. A tab member of nonuniform thickness formed along the second longitudinal edge of each of the first and second halves includes a plurality of substantially aligned apertures. The nonuniform thickness tab member along the first half second longitudinal edge is secured to the nonuniform thickness tab member along the second half second longitudinal edge by snaps penetrating through the aligned apertures. Each snap has a cylindrical section of a first diameter exceeding the aperture diameter with an end contacting the the tab member of the second longitudinal edge of the first half and a tapered section axially aligned with the cylindrical section having one end facing the cylindrical section of a diameter smaller than the aperture diameter and the other end of a diameter exceeding the aperture diameter. The tab member of the second half second longitudinal edge contacts the snap penetrating therethrough along the tapered section to urge the nonuniform tab members of the first and second halves into sealed contact.

According to one aspect of the invention, the two halves forming the closure are connected together lengthwise along the first longitudinal edges by a flexible hinge.

According to another aspect of the invention, the snaps may be constructed so that each will break off when a force in excess of a defined threshold, is applied to pry the two tabs apart. Such break-off at a predefined threshold may be provided by a notch or groove in the section of the snap within the tab apertures having a diameter less than the aperture diameter. An advantage of the closure with notched snaps is that the prying apart of the two tabs using force greater than a defined value causes the nearest snaps to break. The snap breakage serves as a clear indication to telephone company personnel that unauthorized entry to the splices has either been gained or attempted.

According to yet another aspect of the invention, the closure may be made integrally by vacuum forming or by another inexpensive process which results in tabs that vary in thickness. Snaps having tapered sections allow this thickness variation and yet establish a tight seal. Although vacuum forming is used, it is possible to use other methods, such as molding, to fabricate the closure.

According to yet another aspect of the invention, the closure comprises a central section intermediate two smaller end sections. An open cell foam strip fits snugly between each end section and the enclosed aerial cables. The open cell foam strips permit entry of encapsulant into the central section even if the longitudinal edges are completely sealed. The foam absorbs the liquid encapsulant. When the encapsulant solidifies within the open cell foam, a solid barrier is formed to prevent ingress of contaminants into the central cavity. Each end section may also have an opening to permit an electrical bonding means to interconnect the grounding sheath of the two sections of the aerial cable.

DETAILED DESCRIPTION

Figure 1:
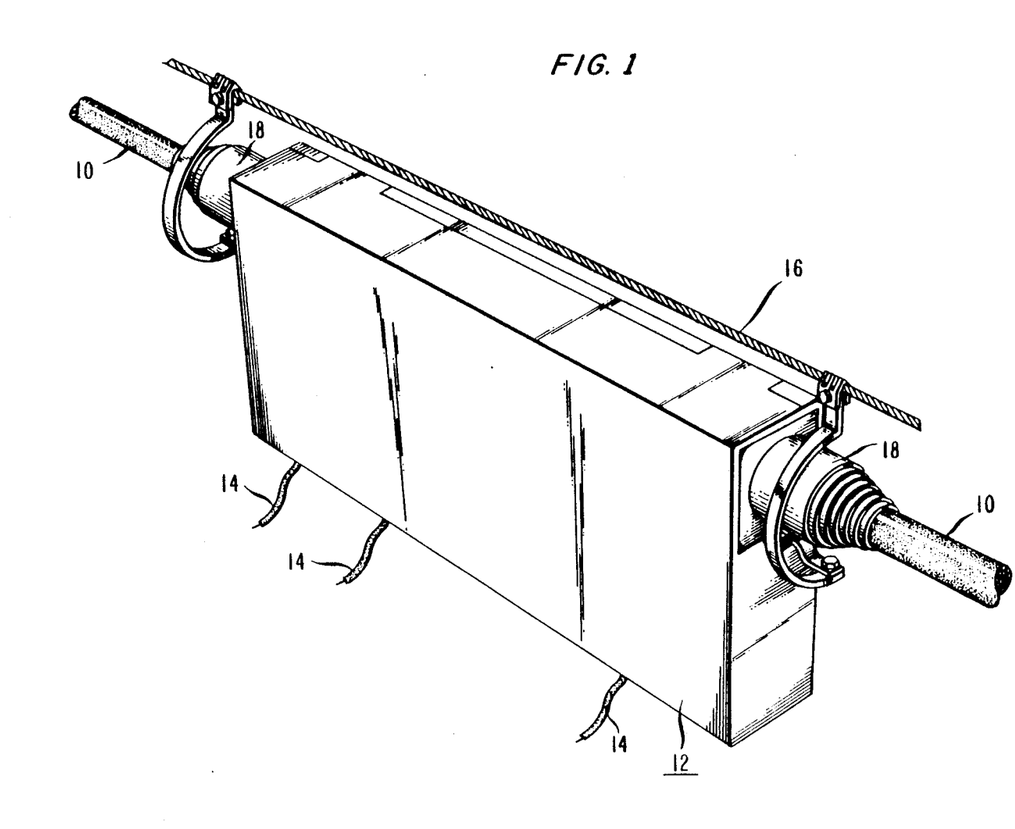
FIG. 1 is a perspective rear view of the terminal mounted on an aerial cable.

Referring to FIG. 1, an aerial cable 10 is shown entering the upper portion of each end of terminal 12 through a boot or sleeve 18. A plurality of service or drop wires 14 are seen leaving the lower portion of terminal 12. Cable 10 and terminal 12 are suspended from cable strand 16.

Figure 2:
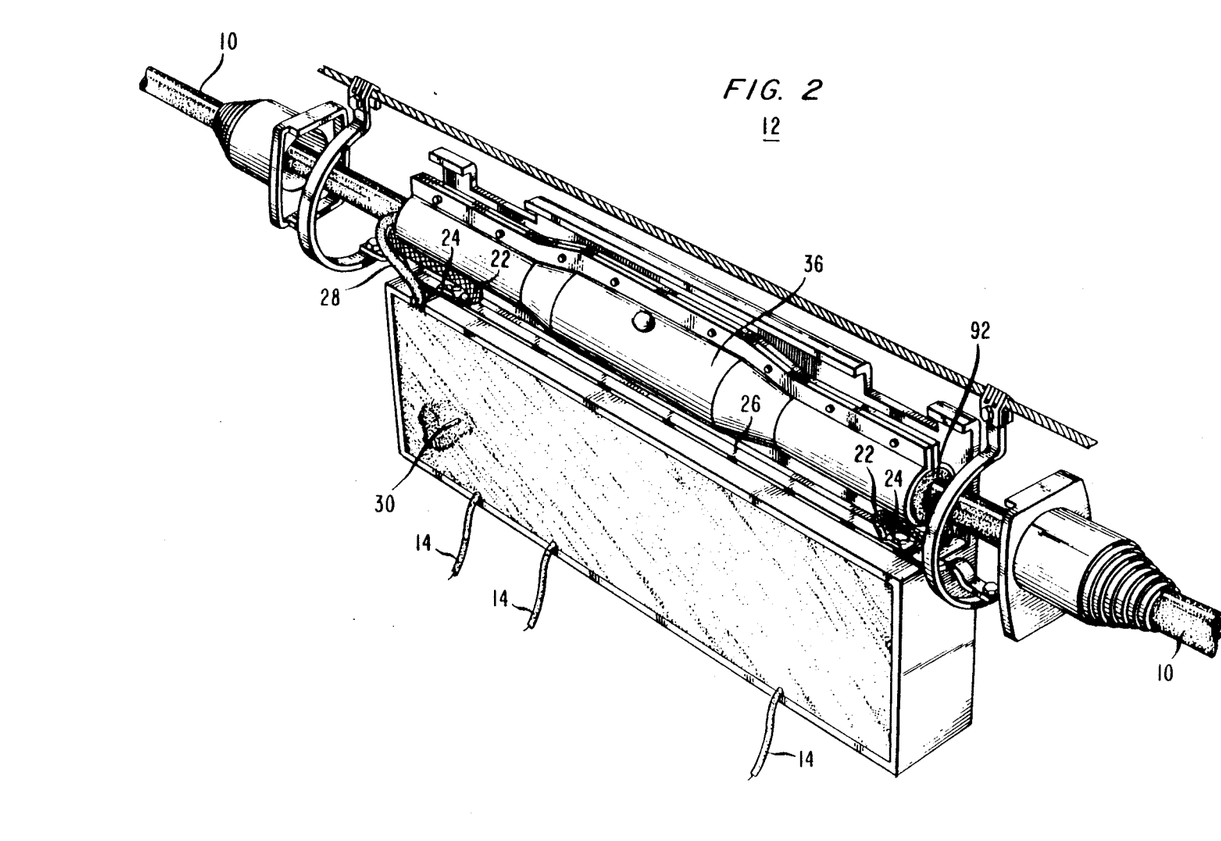
FIG. 2 is an exploded perspective view of the terminal from the rear with the terminal cover removed showing a splice closure.

FIG. 2 shows a perspective view of the rear of terminal 12 with the outer housing removed. Flexible, braided wire 22 is connected via bond clamp or cable shield connector 24 and grounding bar 26 to the cable shield of cable 10 to provide continuity of cable shield across cable splice points and terminals. Stub cable 28 provides electrical paths for signals from cable 10 conductors to binding posts (not shown). A portion of binding post 30 appears at the front side of terminal 12 to facilitate the termination of drop wires 14. Closure 36 surrounds splices between cable 10 and stub cable 28.

Figure 3:
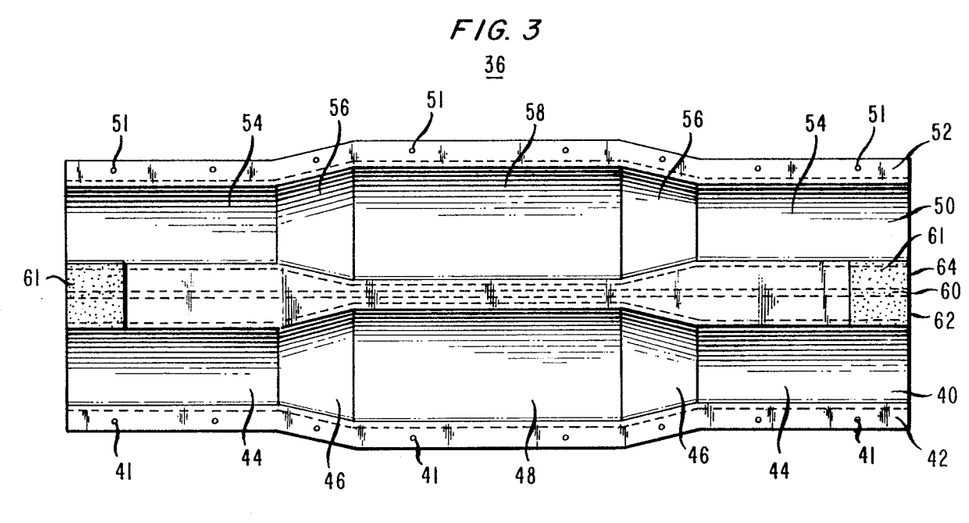
FIG. 3 is an top view of the splice closure of FIG. 2 in an open position.
Figure 4:
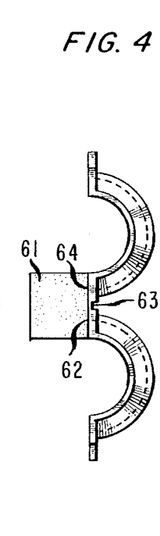
FIG. 4 is an end view of the splice closure FIG. 3.

Referring to FIGS. 3 and 4, closure 36 is shown in an open position. The closure has a first half 40 and a second half 50 joined by flexible hinge 60. First half 40 has a large, central cavity section 48 intermediate two smaller end sections or cavities 44. Central section 48 is attached to end sections 44 via tapered sections 46. Each end section, or cavity, 44 may have an opening for the attachment of bonding means. Tab member 42, running lengthwise along a longitudinal edge of first half 40, is integrally formed with the rest of first half 40. In like manner, tab member 62 runs lengthwise along the other longitudinal edge of first half 40.

Second half 50, likewise, has a large, central section or cavity 58 connected to smaller end sections or cavities 54 via tapered sections 56. Tab member 52, running lengthwise along a longitudinal edge of second half 50, is formed integrally with the rest of second half 50. Both longitudinal tabs 42 and 52 have substantially aligned apertures 41 and 51. In like manner, tab member 64 runs lengthwise along the other longitudinal edge of second half 50.

Flexible hinge, middle section 60 is connected along its edges to tabs 62 and 64. Middle section 60 is made flexible by means of an exterior channel 63 running lengthwise between tabs 62 and 64 shown in FIG. 4 and by use of a suitable material. Wedges 61 which may be made of open cell foam material are placed at the outer ends of sections of the end sections formed by cavities 44 and 54 to fill spaces between tabs 62 and 64 when the cable enclosure is in its closed position. Tab members 42 and 52 and tab members 62 and 64 as well as flexible hinge 60 may be manufactured integrally with first and second halves 40 and 50 by a process known as vacuum forming. As is well known in the art, vacuum forming results in relatively large variations of thickness so that the thicknesses of tabs 42 and 52 are nonuniform and vary along their lengths. Generally, the thickness of the tab portions along the end sections 44 and 54 will be greater than the thickness of the tab portions along central sections 48 and 58.

Figure 5:
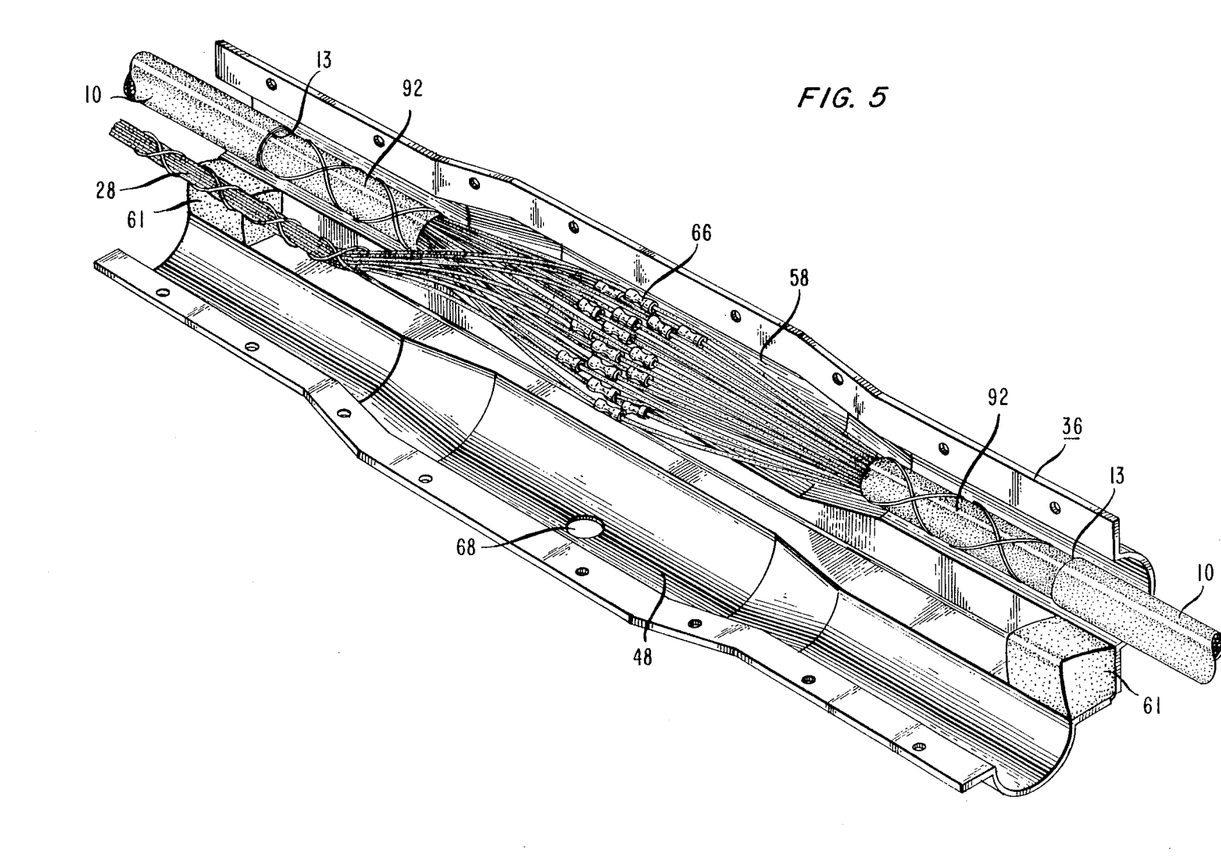
FIG. 5 is a perspective view of the splice closure of FIGS. 3 and 4 surrounding the splices to be enclosed.

Referring to FIG. 5, there is shown closure 36 partially placed around a plurality of splices 66 between conductors from aerial cable 10 and stub cable 28 so that splices 66 will be located in the cavity formed by central sections 48 and 58. Cable shields 13 at both ends of closure 36 are interconnected, for continuity, by braided cable 22, bonding clamp 24 and ground bar 26 as shown in FIG. 2. Foam strips 92 which may be made from open cell foam material are wrapped around the bundle of wires of cable 10 at each end of closure 36 as shown in FIG. 5.

Figures 6, 7:
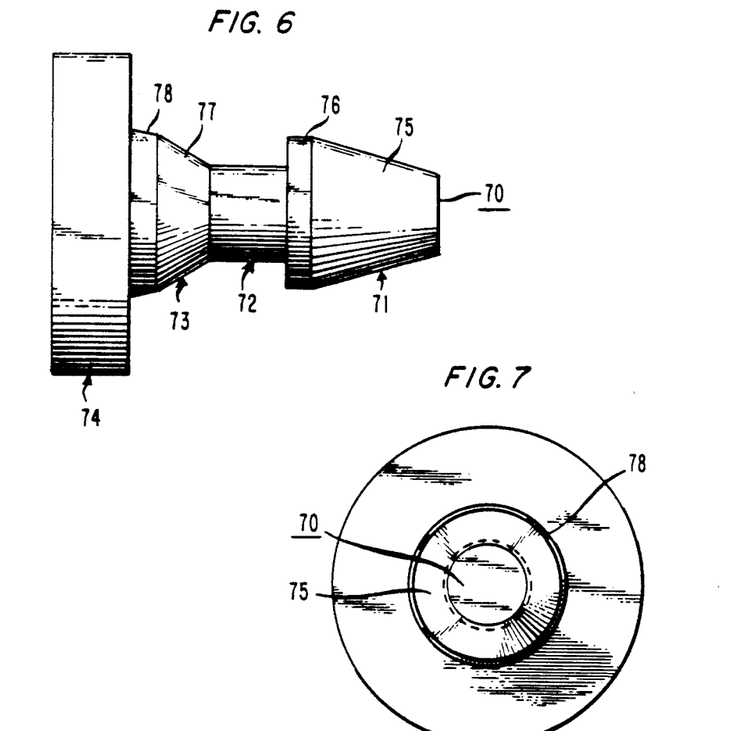
FIG. 6 is an elevational view of a first form of snap which is used to secure the two ends of the closure of FIG. 3.
FIG. 7 is an end view of the snap of FIG. 6.

There is shown in FIGS. 6 and 7, in elevation and end views, a first embodiment of means 70 for securing tabs 42 and 52 of FIG. 3 in contact. The securing means is a snap or dart having four axially aligned sections made from a single piece of material such as polycarbonate by molding or machining, i.e., first section 71, a second section 72, a third section 73 and fourth section 74. Section 71 has a front, tapered end 75 and a rear, cylindrical end 76. Cylindrical, section 72 is adjacent to cylindrical rear end 76 of front section 71 but has a diameter smaller than the diameter of cylindrical, rear end 76. The diameter of section 72 is smaller than apertures 41 and 51 of tabs 42 and 52. The front face of tapered end 75 fits easily into apertures 41 and 51 of tabs 42 and 52 of FIG. 3 but the diameter of rear cylindrical end 76 is larger than apertures 41 and 51. Because cylindrical, rear end 76 is larger than aperture 51, pressure must be applied to force snap 70 into aperture 51. Tab 52 may be made of a plastic material such as a polycarbonate which deforms slightly under pressure but resumes its shape. When shipped from a factory, snaps 70 may be already inserted into all apertures 51 of tab 52, to facilitate later assembly in the field.

Third section 73 has a tapered front end 77 and a rear tapered end 78. The taper of front end 77 is such that the portion of tapered front end 77 adjacent to cylindrical second section 72 has substantially the same diameter as section 72 while the diameter of tapered front end 77 adjacent to end 78 is larger as shown in FIG. 6. The angle of taper of rear section 78 is less than that of front end 77 and, in the preferred embodiment, is about three degrees. Fourth section 74 is cylindrical and has a diameter larger than the end of rear taper 78 of third section 73.

After closure 36 has been placed around splices 66 and tabs 52 and 42 are to be secured together, snaps 70 are forced through apertures 41, the snaps having been already inserted into apertures 51 at the factory. As aforementioned, tabs 42 and 52 can vary substantially in thickness. To prevent leakage of encapsulant through clamped tabs 42 and 52, it is necessary to provide effective contact independent of variations of thickness. This contact which may be a sealed contact is assured by the two tapers 77 and 78 in third section 73.

Figures 9, 10, 11, 12, 13:
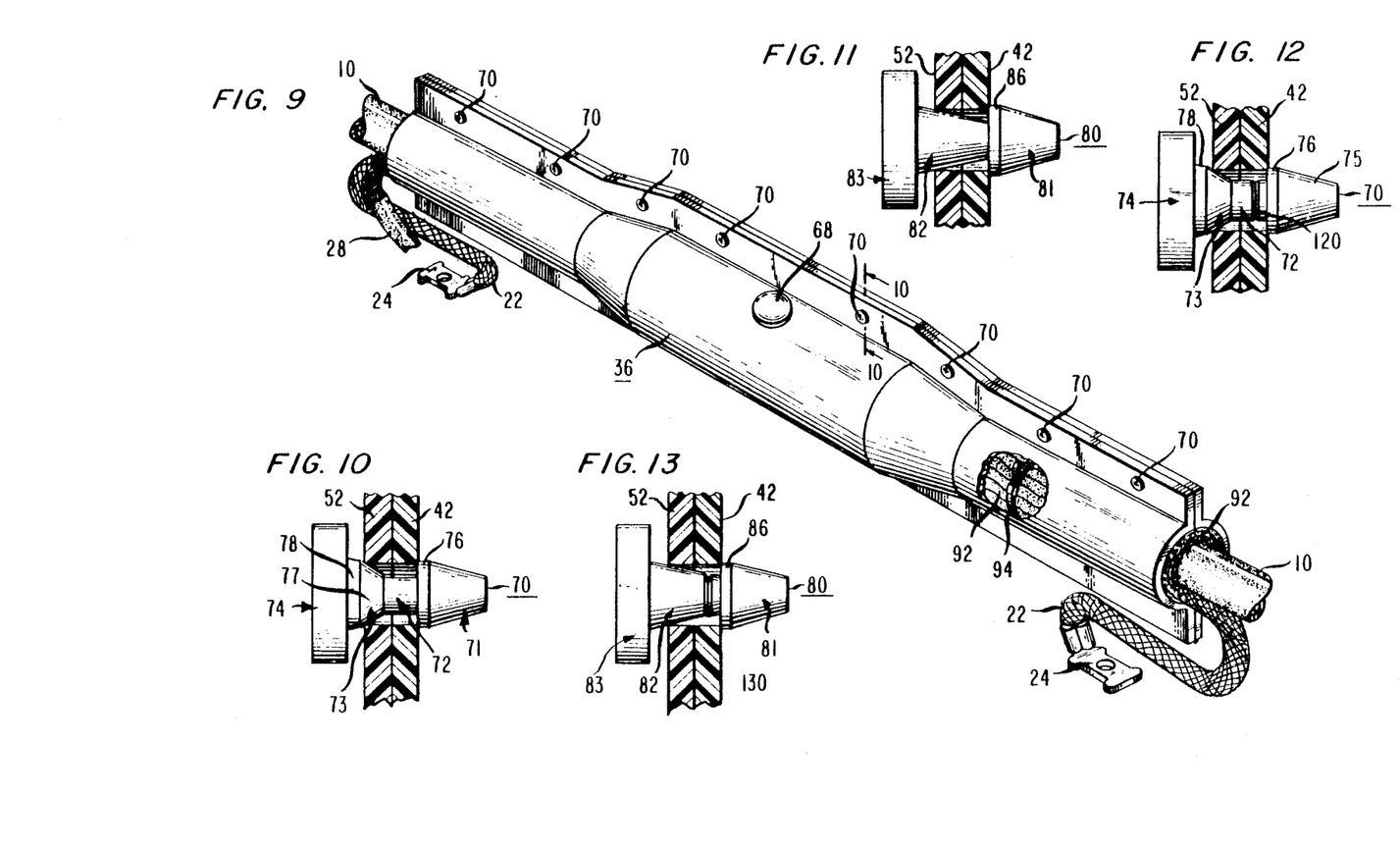
FIG. 9 is a perspective view of the splice closure of FIGS. 3 and 4 when closed.
FIG. 10 is a sectional view taken along line 10—10 of FIG. 9 of a snap constructed according to FIGS. 6 and 7 seated within the tabs of the splice closure of FIG. 9.
FIG. 11 is a sectional view taken along line 10—10 of FIG. 9 of a snap constructed according to FIG. 8 seated with the tabs of the splice closure of FIG. 9.
FIG. 12 is an elevational view of a snap constructed according to FIGS. 6 and 7 used to secure the two ends of the closure of FIG. 9 which has a V-shaped groove to facilitate breakage.
FIG. 13 is an elevational view of a snap constructed according to FIG. 8 used to secure the two ends of the closure of FIG. 9 which has a V-shaped groove to facilitate breakage.

FIG. 10 shows a sectional view taken along line 10—10 through snap 70 illustrated in the perspective view of the splice closure of FIG. 9. As shown in FIG. 10, a face of rear end 76 of section 71 of snap 70 rests on the outside of tab 42. Section 72 of the snap extends through aperture 41 of tab 42 and partially through aperture 51 of tab 52. The aperture surface of tab 52 rests somewhere along taper 77 of section 73 so that a considerable range of tab thickness may be accommodated by taper 77. In the event that the thickness of tabs 42 and 52 extends beyond the length of taper 77, tab 52 rests on taper 78. As is apparent from FIG. 10, the angle of the taper of tapered portion 77 determines the force exerted on the aperture in tab 52. If the taper angle is too small, the force exerted is limited and edges 42 and 52 may not be in tight contact. If the angle of taper is too long, the force exerted against the outer edge of tab 52 may deform the aperture therein. It is also apparent from FIG. 11, that the angle of taper is determined by the length of tapered section 82 but that the angle is limited to avoid deformation of the aperture in tab 52. Advantageously, the arrangement of sections 72 and 73 in the snap of FIG. 6 permits location of section 73 and selection of the angle of taper of taper 77 for different ranges of tab thicknesses to assure tight contact between nonuniform thickness tabs 42 and 52 without deformation of the aperture in tab 52 owing to excessive force. The axial length and the angle of taper of section 78 are also chosen to effect a predetermined force on the outer edge of tab 52 in the event the thickness of tabs 42 and 52 exceeds the range tab thicknesses accommodated by tapered section 77. The angle of taper of taper 78 is made smaller relative to that of section 77 to assure the correct range of force on the outer edge of tab 52 at the increased thickness so that clamping contact is made but there is no deformation of the aperture in tab 52. In accordance with the invention, the tapered construction of snap 70 assures a seal-like contact all along the inner surfaces of tabs 42 and 52 to prevent leakage of encapsulant although the thicknesses of the tabs vary substantially.

The axial lengths of the sections in FIGS. 6 and 7 are dependent on the thicknesses of the longitudinal edges. Sections 71, 72, 73, and 74 in FIG. 6 may, for example, have respective axial lengths of 0.2, 0.075, 0.1 and 0.1 inch. The diameter of cylindrical, rear end 76 of the first section 71 is slightly more than one and one half times the diameter of the front end of taper 75. The diameter of cylindrical, rear end 76 is about 1.6 times the diameter of second section 72. The angle of taper of the front end 77 of section 73 is about thirty degrees. The diameter of cylindrical fourth section 74 is about twice that of the diameter of cylindrical rear section 76 of the first section 71.

Snap 70 may be constructed in such a way that snap 70 breaks off at section 72 when tabs 52 and 42 are pried apart. This is possible because the diameter of second section 72 is smaller than the openings of apertures 41 and 51. When tabs 42 and 52 are pried apart by a force greater than a predetermined threshold, snap 70 will break somewhere along second section 72. FIG. 12 shows a snap constructed according to FIGS. 6 and 7 which has a V-shaped notch or groove 120 in section 72 to assure breakage at the groove. The depth of groove 120 may, for example, be 1/10th the diameter of cylindrical section 72. A broken snap will indicate to telephone company personnel that unauthorized entry has been either gained or attempted.

Figure 8:
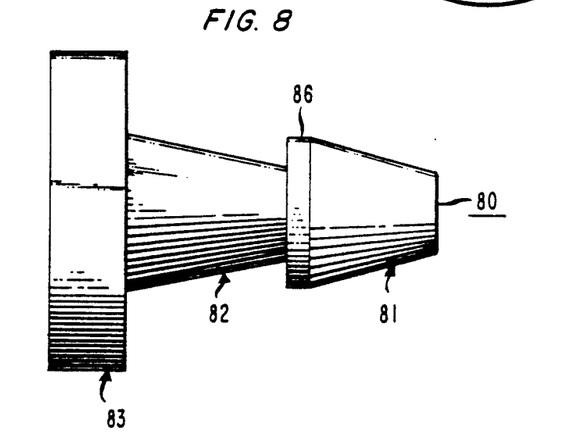
FIG. 8 is an elevational view of a second form of snap that may be used with the splice closure of FIG. 3.

Referring to FIG. 8, there is shown a second embodiment of means for securing tabs 42 and 52 of FIG. 3. Securing means 80 has three axially aligned sections: first section 81, second section 82 and third section 83. The length of first section 81 may be 0.175 inch. The length of second section 82 may be 0.2 inch and the length of third section 83 may be 0.1 inch. Section 81 corresponds to section 71 of FIG. 6. Section 82 corresponds to sections 72 and 73 of FIG. 6 and section 83 corresponds to section 74 of FIG. 6. First section 81 and third section 83 have geometry and dimensions substantially similar to corresponding sections 71 and 74 of the first embodiment of snap 70 of FIGS. 6 and 7.

Second section 82 is tapered from the front joint with first section 81 to the rear joint with third section 83, the taper being an angle of about eleven degrees. The diameter of cylindrical, rear end 86 of front section 81 is about 1.6 times the diameter of the front end of tapered second section 82. FIG. 11 shows a sectional view taken along line 10—10 through a snap using the construction of snap 80 in FIG. 8 illustrated in the perspective view of the splice closure of FIG. 9. As shown in FIG. 11, a face of rear end 86 of section 81 rests on the outside of tab 42. Section 82 of the snap extends through aperture 41 of tab 42 and through aperture 51 of tab 52. The outer surface of tab 52 rests somewhere along tapered section 82 so that a considerable range of tab thickness may be accommodated by tapered section 82. As stated with respect to FIG. 10, the tapered construction of snap 80 assures tight contact all along the inner surfaces of tabs 42 and 52 although the thicknesses of the tabs vary substantially.

FIG. 13 shows a cross section taken along line 10—10 in FIG. 9 with a snap constructed according to FIG. 8. The snap in FIG. 13 has a V-shaped groove 130 in tapered section 82 to facilitate break off of snap 80. Groove 130 may be 1/10 the diameter of the portion of section 82 whereat it is provided and is generally located at a point along the length of section 82 that has a diameter smaller than the apertures in tab members 42 and 52.

Referring to FIGS. 2, 5, and 9, there is shown closure 36 in an assembled state. Foam strip 92 has been bound to cable 10 and secured by ties 94. Bonding clamp 94 and braided wire 22 interconnect the cable shield 13 of the two ends of aerial cable 10 via ground bar 26 to provide continuity. As aforementioned, snaps 70 that clamp tabs 42 and 52 together assure tight contact along the closure tabs.

Encapsulant is poured through aperture 68 into closure 36. While air may flow through the contacting surfaces of clamped tabs 42 and 52, encapsulant does not leak therethrough. Whether or not air exits through the clamped tabs, it flows into open cell foam strips 92 and open cell foam wedges 61 between tabs 62 and 64 as the encapsulant enters and fills the closure. When the encapsulant reaches the foam strips, it fills the open cells therein and is impeded from passing therethrough. The open cell foam acts as an effective barrier to encapsulant leakage from the central cavity section through the closure end sections and longitudinal tabs 42 and 52 form a substantial seal to encapsulant flow along the longitudinal edges of the closure. The contained encapsulant sets in a few minutes so that the open cell foam structure is filled with solidified encapsulant. The filled foam strips are then effective as a barrier to prevent moisture or other contaminants from entering the closure.

The invention has been illustrated and described with reference to a particular embodiment thereof. It is to be understood, however, that various changes and modifications may be made by those skilled in the art without departing from the spirit and scope of the invention.

What is claimed is:

1. Apparatus enclosing splices in a cable comprising:
a body shaped to form a longitudinal cavity enclosing the splices including a first half and a second half, each body half having a first longitudinal edge and a second longitudinal edge,
the first longitudinal edges of said first and second halves being joined along their lengths;
a tab member of nonuniform thickness formed along the second longitudinal edge of each of said first and second halves, the tab members of nonuniform thickness including a plurality of substantially aligned apertures, and
means for securing the nonuniform thickness tab member along the second longitudinal edge of the first half to the nonuniform thickness tab member along the second longitudinal edge of the second half through said apertures in clamped relationship, said securing means including a device for penetrating through each aperture comprising
a cylindrical section of a first diameter exceeding the aperture diameter with an end for contacting the tab member of the second longitudinal edge of the first half and a tapered section axially aligned with said cylindrical section having one end of a diameter smaller than the aperture diameter facing the first diameter cylindrical section and another end having a diameter exceeding the aperture diameter defining a predetermined taper angle, said tapered section being axially located to contact the tab member of the second longitudinal edge of the second half all along the periphery of the aperture at the predetermined angle of taper to urge the tab members of the second longitudinal edges of the first and second halves into tight contact.

2. Apparatus enclosing splices in a cable according to claim 1 wherein said body comprises a central section intermediate a first end section and a second end section for said cable to enter the central section,
a foam strip surrounding said cable within each end section of the body,
an aperture in one of the central sections of the first and second body halves for receiving a settable liquid encapsulant to fill said central section,
a settable liquid encapsulant filling the interior of the central section and being contained within the central section by the second longitudinal edge tab members held in said tight contact by a plurality of said securing means devices
and said foam strips surrounding the cable at said first and second end sections.

3. Apparatus enclosing splices in a cable according to claim 1 wherein the device penetrating through each aperture breaks responsive to the tab members of nonuniform thickness being pried apart using a force greater than exerted by the tapered section urging the tab members of the second longitudinal edges of the first and second halves into tight contact.

4. Apparatus enclosing splices in a cable according to claim 1 wherein the tapered section of the device penetrating through each aperture comprises a front portion facing said first diameter cylindrical section having a first taper and a rear portion having a second taper, the angle of taper of the front portion being selected to urge the tab members of the second longitudinal edges of the first and second halves into tight contact over a prescribed range of tab thickness and the angle of taper of the rear portion being selected to urge the tab members of the second longitudinal edges of the first and second halves into tight contact over a range of tab thickness greater than said prescribed range.

5. Apparatus enclosing splices in a cable according to claim 4 wherein said device penetrating through each aperture further comprises a second diameter cylindrical section joined between and in axial alignment with the front portion of the tapered section and the first diameter cylindrical section, said second diameter cylindrical section having a diameter smaller than the aperture diameter.

6. Apparatus enclosing splices in a cable according to claim 5 wherein said device penetrating through each aperture further comprises a third diameter cylindrical section joined to and in axial alignment with the rear portion of the tapered section, the diameter of said third diameter cylindrical section being greater than the aperture diameter.

7. Apparatus enclosing splices in a cable according to claim 6 wherein said second diameter cylindrical section comprises a grooved portion having a diameter less than said second diameter, said grooved portion breaking responsive to the tab members of nonuniform thickness being pried apart using a force greater than exerted by the tapered section urging the tab members of the second longitudinal edges of the first and second halves into tight contact.

8. Apparatus enclosing splices in a cable according to claim 1 wherein said tapered section comprises a grooved portion located between the portion of the tapered section contacting the tab and the first diameter cylindrical section, said grooved portion having a diameter less than the portion of the tapered section whereat it is provided, so as to break responsive to the tab members of nonuniform thickness being pried apart using a force greater than exerted by the tapered section urging the tab members of the second longitudinal edges of the first and second halves into tight contact.

* * * * *

UNITED STATES PATENT AND TRADEMARK OFFICE
CERTIFICATE OF CORRECTION

PATENT NO. : 4,818,824
DATED : April 4, 1989
INVENTOR(S) : Mayankkumar M. Dixit and Charles Tanzola It is certified that error appears in the above—identified patent and that said Letters Patent is hereby corrected as shown below:

Column 2, line 58, "is an top" should read --is a top--;
Column 2, line 60, "closure FIG. 3;" should read --closure of FIG. 3;--.
Column 4, line 24, "a second" should read --second--;
Column 4, line 25, "a third" should read --third--;
Column 4, line 27, "Cylindrical, section" should read --Cylindrical section--;
Column 4, line 28, "lindrical rear" should read --lindrical, rear--.
Column 5, line 11, "long" should read --large--.
Column 6, line 38, "clamp 94" should read --clamp 24--.

Signed and Sealed this

Twenty-third Day of January, 1990

Attest:

JEFFREY M. SAMUELS

Attesting Officer     Acting Commissioner of Patents and Trademarks